US010965540B2

(12) United States Patent
Urbański

(10) Patent No.: US 10,965,540 B2
(45) Date of Patent: *Mar. 30, 2021

(54) BALANCING DISTANCES BETWEEN NODES ON A TOKEN RING

(71) Applicant: New Relic, Inc., San Francisco, CA (US)

(72) Inventor: Jan Urbański, Warsaw (PL)

(73) Assignee: New Relic, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/721,495

(22) Filed: Dec. 19, 2019

(65) Prior Publication Data

US 2020/0136922 A1 Apr. 30, 2020

Related U.S. Application Data

(63) Continuation of application No. 15/890,010, filed on Feb. 6, 2018, now Pat. No. 10,560,341.

(Continued)

(51) Int. Cl.
*G06F 15/173* (2006.01)
*H04L 12/24* (2006.01)
(Continued)

(52) U.S. Cl.
CPC .......... *H04L 41/145* (2013.01); *H04L 12/417* (2013.01); *H04L 12/433* (2013.01); *H04L 67/1025* (2013.01)

(58) Field of Classification Search
CPC ... H04L 41/145; H04L 12/417; H04L 12/433; H04L 67/1025
(Continued)

(56) References Cited

U.S. PATENT DOCUMENTS 6,421,317 B1 * 7/2002 Denecheau ........... H04L 12/433
370/222
6,483,812 B1 * 11/2002 Prorock ................. H04L 12/433
370/252

(Continued)

OTHER PUBLICATIONS

Bailey N., "Balancing Your Cassandra Cluster," DataStax, Mar. 2, 2012, 6 pages, [Online] [Retrieved on Jun. 17, 2018] Retrieved from the Internet URL:https://www.datastax.com/dev/blog/balancing-your-cassandr-a-cluster, 6 pages.

(Continued)

*Primary Examiner* — Alan S Chou
(74) *Attorney, Agent, or Firm* — Fenwick & West LLP

(57) ABSTRACT

Nodes on a token ring are rebalanced from an initial condition to a condition in which the load is optimally distributed based on a specified level of balance. Nodes are treated as electrically charged particles for purposes of the simulation and are assigned simulation values based on proportions between the size of the cluster, the computing power of the nodes, and the specified level of balance. A simulation module performs the rebalancing simulation by assigning the specified values to the particles and outputting, for each corresponding node, a token indicating the particle's final position and the position of the node on the token ring. The tokens are input to a redistribution module, which rebalances the cluster based on the generated tokens.

20 Claims, 5 Drawing Sheets

Related U.S. Application Data

(60) Provisional application No. 62/454,985, filed on Feb. 6, 2017.

(51) Int. Cl.
  *H04L 12/433* (2006.01)
  *H04L 29/08* (2006.01)
  *H04L 12/417* (2006.01)

(58) Field of Classification Search
  USPC ......................................................... 709/223
  See application file for complete search history.

(56) References Cited

U.S. PATENT DOCUMENTS

| | | | |
|---|---|---|---|
| 6,639,917 B1 * | 10/2003 | Ellington, Jr. .......... | H04L 12/46 370/401 |
| 6,922,663 B1 * | 7/2005 | Maurer ................. | H04L 41/145 703/13 |

OTHER PUBLICATIONS

United States Office Action, U.S. Appl. No. 15/890,010, dated Oct. 31, 2019, 8 pages.

\* cited by examiner

BALANCING DISTANCES BETWEEN NODES ON A TOKEN RING

CROSS-REFERENCE TO RELATED APPLICATIONS

This application is a continuation of co-pending U.S. application Ser. No. 15/890,010, filed Feb. 6, 2018, which claims the benefit of U.S. Provisional Application No. 62/454,985, filed Feb. 6, 2017, both of which are incorporated by reference in their entirety.

TECHNICAL FIELD

The described subject matter generally relates to the field of network-based computer clustering, and, more particularly, to optimizing load balance among servers in a token ring.

BACKGROUND

Load-balancing computer clusters improve performance over a single computer and provide more computing power in a cost-effective manner. Computational workload is distributed among nodes in the cluster to provide better overall performance and faster response times. Current methods for load balancing among computer clusters aim to achieve an optimal distribution in which all nodes are equidistant and are thus able to handle the same load. These methods use an external tool to generate equidistant token values and move nodes until those values are reached. However, doing so causes all nodes but one to be moved, thus resulting in a large number of moves and a higher transaction cost, which may be particularly burdensome for large systems. Further, because existing tools assume that nodes are homogenous and are able to handle the same load, these systems do not account for a situation in which a more powerful machine is incorporated into the cluster.

SUMMARY

To achieve a reasonably balanced cluster of nodes with the minimum number of moves and thus a lower transaction cost, a server performs a redistribution simulation in which nodes on the cluster are treated as electrically charged particles. While existing methods for balancing load distribution are inefficient and costly for larger systems in which all nodes but one need to be moved, the claimed method increases the efficient functioning of the token ring by assigning higher workloads to more powerful nodes and minimizing the number of tokens that need to be moved.

A user interacts with a front-end module on the server to provide a redistribution instruction for a token ring. An initial condition of the token ring is retrieved, reflecting the number of nodes in the cluster, the computing power of each node, and the initial load balance of the nodes. In some embodiments, the user provides rebalancing parameters indicating the desired level of balance for the cluster and assigns simulation values including charge and static friction coefficients for each node, the terminal velocity for the nodes, and the length of the simulation. Additionally or alternatively, a value recommendation module provides some or all of the recommended simulation values based on proportions between the size of the cluster, the computing power of the nodes, and the desired level of balance.

A simulation module performs the rebalancing simulation by assigning the specified parameters to the particles and determines how the particles have been redistributed after the simulation ends. For each node on the token ring, the simulation module outputs a token indicating the particle's final position and the position of the corresponding node on the token ring. The tokens are input to a redistribution module, which rebalances the cluster based on the generated token and outputs a visualization of the rebalanced cluster to the user.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
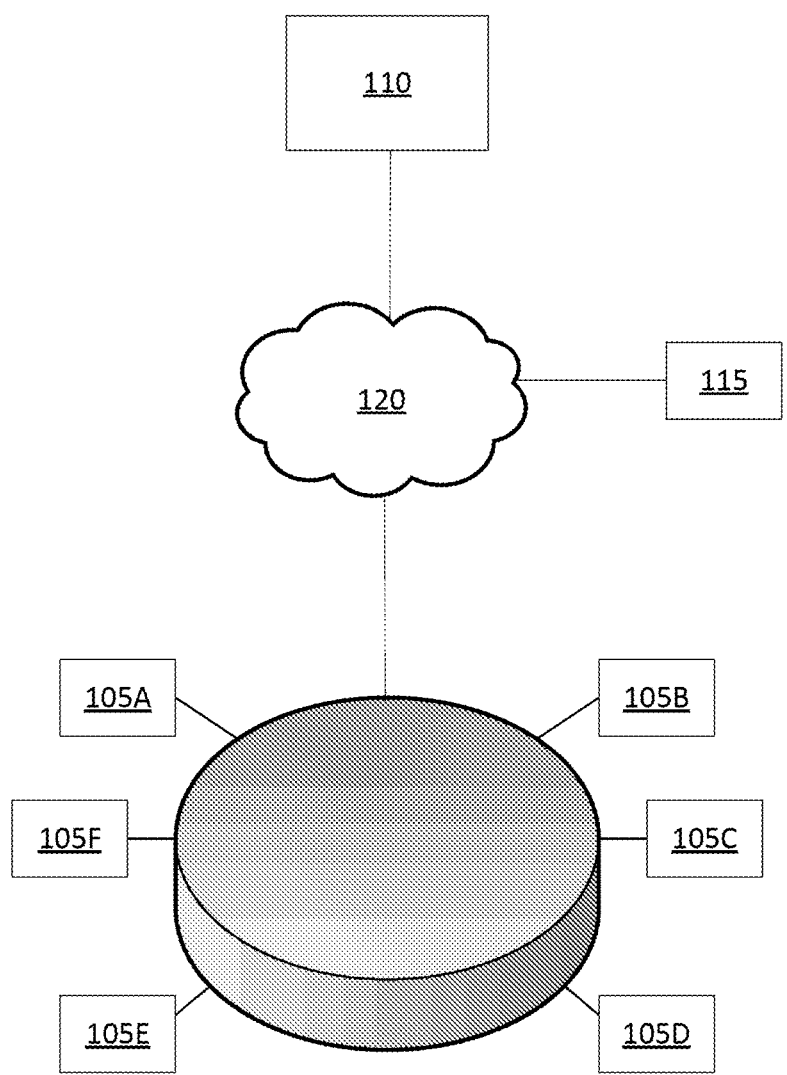
FIG. 1 illustrates a block diagram of an example communications network 100, in accordance with an embodiment.

Turning now to the specifics of the system architecture 100, FIG. 1 is a block diagram illustrating an example communications network 100, in accordance with an embodiment. The system architecture 100 comprises a plurality of nodes 105 (e.g., nodes 105A-105F) in communication with each other through a network 120. While only six nodes 105 are shown in FIG. 1, embodiments of the system architecture 100 may have many such entities connected to the network 120.

In some embodiments, nodes 105 are arranged in a token ring (also described herein as a "cluster"). Example nodes may include networked computing devices capable of receiving user input as well as transmitting and/or receiving data via the network 120. One or more logical tokens are passed between the nodes, enabling the node holding a logical token to send data packets to neighboring nodes. Each node 105 is responsible for the portion of the cluster between itself and its predecessor.

The distance between the nodes 105 on the token ring reflects the amount of data that each node 105 can process. In some embodiments, the initial position of the nodes 105 on the token ring is equidistant such that there is equal distribution of load among the nodes 105. The nodes can be rearranged to create small imbalances to alter the amount of data that a particular node 105 can handle. In other embodiments, the initial position of the nodes 105 on the token ring varies, reflecting a load balance in which some nodes 105 handle more data than others. The nodes 105 can be rearranged to create a more balanced distribution of data.

The nodes 105 are configured to communicate with a server 110 via the network 120, which may comprise any combination of local area and/or wide area networks using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

A client 115 also communicates with the server 110 to provide a rebalancing instruction. A client 115 is a computing device capable of receiving user input as well as communicating via the network 120. While a single client device 115 is illustrated in FIG. 1, in practice many client devices 115 may communicate with the systems in the system architecture 100. In one embodiment, a client device 115 is a conventional computer system, such as a desktop or laptop computer. Alternatively, a client device 115 may be a device having computer functionality, such as a personal digital assistant (PDA), a mobile telephone, or a smartphone.

Figure 2:
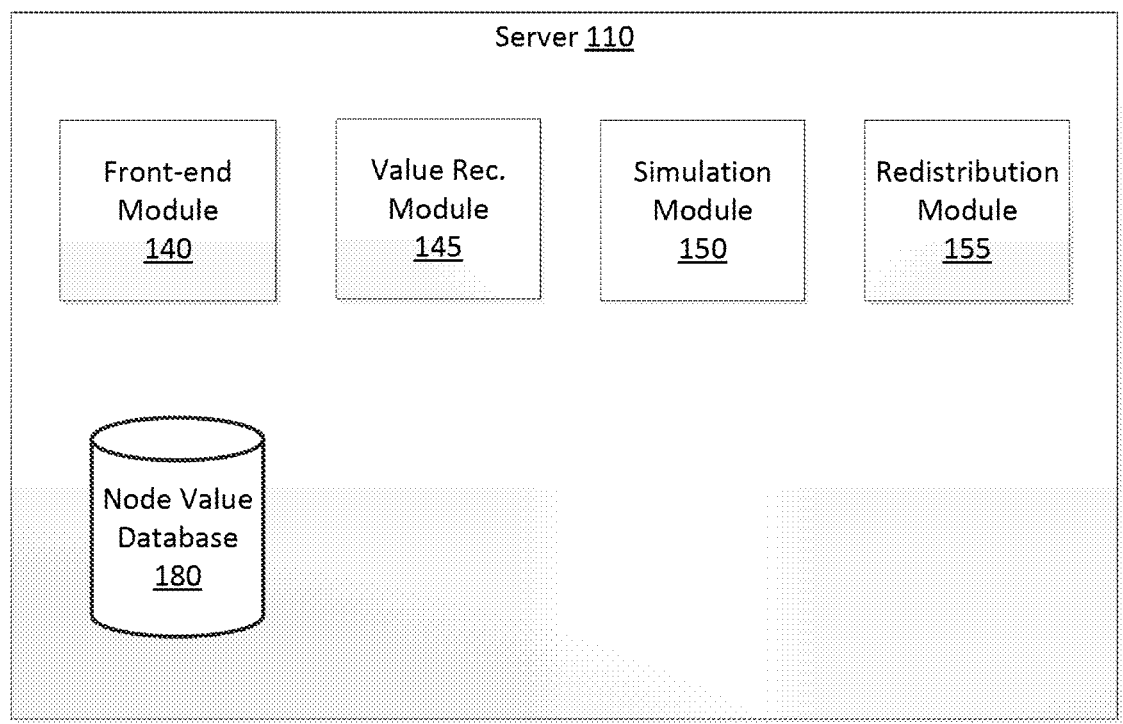
FIG. 2 illustrates a block diagram of an example server 110 for redistributing nodes in a token ring, in accordance with an embodiment.

FIG. 2 illustrates a block diagram of an example server 110 for redistributing nodes in a token ring, in accordance with an embodiment. The server 110 receives the initial distribution of nodes 105 around the token ring and runs a simulation responsive to user input comprising a request to rebalance the nodes 105. Although only a single server 110 is shown, the server 110 may comprising one or more computing devices executing the simulation function.

In one embodiment, the server 110 performs the rebalancing simulation by representing each node 105 in the cluster as an electrically charged particle and applying Coulomb's Law such that the nodes 105 repel each other with a force proportional to the product of their charges and inversely proportional to the square of their distance, which is calculated as the arc length between the nodes on the ring. During the simulation, charges and static friction values are applied to each node 105 such that a node 105 that has reached its terminal velocity and is exposed to a force acting in the direction opposite to the node's velocity will stop. In one embodiment, the server 110 runs the simulation for several hundred iterations and calculates forces between every pair of nodes 105 and updates the current position and velocity of every node 105 in each iteration. Once the simulation ends, the final positions of the nodes 105 on the ring are taken as the nodes' target token values and may be used to redistribute the nodes.

The server 110 shown by FIG. 2 includes a front-end module 140, a value recommendation module 145, a simulation module 150, a redistribution module 155, and a node value database 180. Those of skill in the art will recognize that other embodiments of the server 110 can have different and/or other modules than the ones described here, and that the functionalities can be distributed among the modules in a different manner.

The front-end module 140 facilitates communication between a user providing a rebalancing instruction and the various modules on the server 110 and instructs the modules to perform certain actions responsive to the user input. The front-end module 140 receives an initial condition of nodes 105 in a token ring for which a user has provided a rebalancing instruction. Visualization of the initial condition can be provided by tools such as DataStax OpsCenter.

In one embodiment, the initial condition includes the number of nodes 105 in the cluster, the computing power of each node 105, and the distribution and load balance of the nodes 105. The length of the arc between adjacent nodes 105 is proportional to the amount of data that each node 105 can handle. For example, the initial condition might indicate that node A is located close to adjacent node B on the token ring. If the distance between nodes A and B is half of the distance between nodes B and C, then node C is capable of handling twice the amount of data as node B.

In some embodiments, the front-end module 140 also receives user input of rebalancing parameters. The rebalancing parameters include a desired level of balance of the cluster and simulation values for performing the simulation. In one embodiment, the desired level of balance is indicated by a maximum transaction cost that the user is willing to tolerate to rebalance the ring. Alternatively, a desired level of balance can be set by changing the static friction coefficient, as discussed below. In embodiments where each node 105 in the cluster has equal computing power, an optimal balance is equidistance between the nodes 105. However, the user input may indicate that some of the nodes 105 have greater computing power than other nodes 105 such that an optimal balance for the cluster includes more powerful nodes being located further away from adjacent nodes 105 on the token ring.

In embodiments where the server 110 performs the simulation by representing the nodes 105 as electrically charged particles and applying Coulomb's Law, the simulation values include the charge coefficient and static friction coefficient of each node 105, the terminal velocity of the nodes 105, and the length of the simulation. For example, for a system with $2^{64}$ possible token values, a charge coefficient might be $10^{25}$, a static friction coefficient might be $10^9$, and a terminal velocity might be $7.2*10^{16}$.

The charge coefficient indicates the strength of the charge on each of the nodes 105. In one embodiment, assigning a high charge coefficient to a node 105 causes the node to repel other nodes 105 more strongly and thus creates more space between the node 105 and the adjacent nodes 105 on the token ring. In embodiments where the distance between nodes 105 on the ring is directly proportional to the amount of data that each node 105 is able to process, nodes 105 with a high charge coefficient are assigned more data to process than nodes 105 with lower charge coefficients. Similarly, nodes 105 with high charge coefficients are more easily able to overcome static friction to repel adjacent nodes 105.

The static friction coefficient represents the force required to move a node 105 during the rebalancing simulation. In one embodiment, the static friction coefficient is adjustable such that, during the simulation, the user may change the coefficient based on how willing the user is to accept moves and the resulting transaction costs. For example, assigning a low static friction coefficient will cause more nodes 105 to move during the rebalancing process and thus result in higher transaction costs. By contrast, a high coefficient of static friction might prevent any of the nodes 105 from moving if the system is unable to overcome the friction. As noted above, in embodiments where the user input includes a high static friction coefficient, a higher charge coefficient will be required to cause the nodes 105 to be able to overcome the static friction and repel adjacent nodes 105 on the ring.

The terminal velocity of the nodes 105 represents the maximum velocity that a node 105 can reach during the simulation. A node 105 that has reached its terminal velocity will stop when exposed to a force acting in the opposite direction of the node's velocity, thus causing the simulation to run more quickly than if dynamic friction were used to slow down the nodes 105 until they reached their final position.

In one embodiment, the terminal velocity remains at a constant during the rebalancing simulation to produce a well-balanced cluster. If the terminal velocity is too low, the nodes 105 will move more slowly, resulting in a longer simulation and higher transaction cost. By contrast, if the terminal velocity is too high, a node 105 might overshoot the user's desired balance state and stop too close to a neighboring node 105, causing the neighboring node 105 to move during the next iteration of the simulation.

The simulation values additionally include the length of the rebalancing simulation. In one embodiment, the length of the simulation is measured in iterations. Alternatively, the simulation may be time-based. In either embodiment, the length of the simulation is longer if the terminal velocity or charges are low because the forces acting on the nodes 105 are small, causing the nodes 105 to travel shorter distances and requiring the simulation to run longer for the desired balance to be achieved. By contrast, a higher terminal velocity and lower static friction coefficient will result in a shorter simulation.

In embodiments where the user input does not include the charge or static friction coefficients, the terminal velocity, and/or the length of the simulation, the front-end module 140 instructs the value recommendation module 145 to provide recommended simulation values based on proportions between the size of the token ring, the computing power of the nodes 105, and the desired level of balance. For example, if a first node 105 in the cluster is twice has twice the computing power of other nodes 105, the value recommendation module 145 recommends doubling the charge coefficient assigned to the first node 105 to cause the first node 105 to repel the other nodes 105 more strongly, thus resulting in greater distance between the first node 105 and adjacent nodes 105. Similarly, the value recommendation module 145 recommends a high static friction coefficient if the user is unwilling to tolerate a high transaction cost for the simulation (i.e., the user is willing to accept a higher level of imbalance between the nodes 105 in order to reduce the total number of moves). In embodiments where the desired level of balance is specified by a maximum transaction cost, the value recommendation module 145 generates an estimated transaction cost for performing the simulation using the recommended values.

In one embodiment, the value recommendation module 145 sends the recommended values to the front-end module 140 for output to the user. If the user accepts the recommended values, the front-end module 140 instructs the simulation module 150 to perform the rebalancing simulation based on the approved values. If the user does not accept the recommended values and/or provides additional user input (e.g., an updated maximum transaction cost), the front-end module 140 instructs the value recommendation module 145 to generate new recommendations based on the additional user input. In other embodiments, the value recommendation module 145 sends the recommended values directly to the simulation module 150 without outputting the values to the user.

The simulation module 150 performs the rebalancing simulation using the initial positions of the nodes 105 on the ring, the charge and static friction coefficients, the terminal velocity, and the length of the simulation based on the user input and/or on the recommendations from the value recommendation module 145. For each of the nodes 105, the simulation module 150 outputs a new token that indicates the node's final simulation position on the ring and the amount of data that the node 105 is responsible for (i.e., the distance between each node 105 and its predecessor node 105).

The simulation module 150 sends the tokens for each node 105 to the redistribution module 155, along with an instruction to initiate the rebalancing of the cluster. The redistribution module 155 redistributes the nodes from the initial condition on the ring based on the generated tokens and outputs a visualization of the rebalanced cluster to the user through the front-end module 140. The redistribution visualization includes the location of each node 105 on the ring, the distance between each of the nodes 105, and the amount of data that each node 105 is responsible for processing. In some embodiments, the output to the user includes an option to run the simulation for additional iterations and/or change the simulation input values, if, for example, the user is willing to tolerate a higher transaction cost or wants some of the nodes 105 to handle more data than others.

The node value database 180 stores the user input, the recommended values, and the generated tokens for later use by the modules of the server 110. In some embodiments, the value recommendation module 145 queries the node database 180 for stored values from previous simulations to generate recommended values for a new simulation. Additionally or alternatively, when the user provides an instruction to perform a rebalancing simulation of a token ring, the front-end module 140 queries the node value database 180 to determine whether the cluster has previously been rebalanced. If the node value database 180 indicates that the server 110 has previously performed a redistribution simulation for the cluster, the node value database 180 returns the values associated with the redistribution to the front-end module 140 for display to the user, allowing the user to indicate whether the same values or different values should be used for the subsequent simulation.

Figure 3:
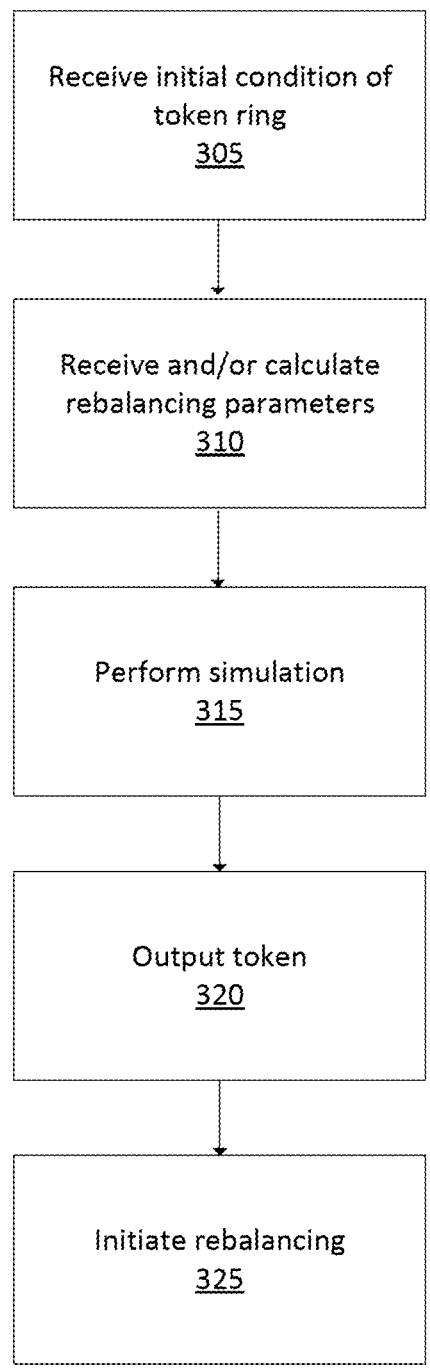
FIG. 3 is a flow chart illustrating interactions among the entities of FIG. 2 to support a load balancing simulation.

FIG. 3 is a flow chart illustrating interactions among the entities of FIG. 2 to support a load balancing simulation, in accordance with an embodiment. The steps of FIG. 3 represent the perspective of the server 110. However, some or all of the steps may be performed by other modules or entities. In addition, some embodiments may perform the steps in parallel, perform the steps in different orders, or perform different steps.

The method begins with the front-end module 140 receiving 305 an initial condition of a token ring for which a user has provided a rebalancing instruction. In one embodiment, the initial condition includes the number of nodes 105 in the cluster, the computing power of each node 105, and the distribution of the nodes 105 on the token ring (i.e., the distance between the nodes 105 and the corresponding load balance assigned to each node 105).

At 310, rebalancing parameters including simulation values are received from the user through the front-end server 140 and/or calculated by the value recommendation module 145. In some embodiments, initial input provided by the user includes the desired level of balance for the cluster, which may be indicated by a maximum transaction cost for the rebalancing and/or a maximum number of nodes that may be moved during the rebalancing.

In embodiments where the server 110 performs the rebalancing simulation by representing the nodes 105 as electrically charged particles, simulation values also include the charge coefficient and static friction coefficient of each node 105, the terminal velocity of the nodes 105, and the length of the simulation, as discussed above with respect to FIG. 2. In some embodiments, the simulation values are provided via user input through the front-end module 140. Alternatively, some or all of the simulation values may be calculated by the value recommendation module 145 based on proportions between the number of nodes 105 in the cluster, the computing power of each node 105, and the desired level of balance.

At 315, the simulation module 150 performs the rebalancing simulation using the parameters provided by the user and/or calculated by the value recommendation module 145. Each node is represented as a particle to which the charge and static friction coefficients and the terminal velocity are applied. The simulation module 150 applies Coulomb's Law, whereby electrically charged particles with the same charge sign repeal each other with a force proportional to the product of their charges and inversely proportional to the square of their distance, which is calculated as the arc length between nodes on the token ring.

The simulation module 150 determines how the particles have been redistributed after the specified number of iterations or period of time, and for each node 105, outputs 320 a token indicating the particle's final position in the simulation and the corresponding position of the node 105 on the token ring.

The simulation module 150 sends the tokens to the redistribution module 155, which initiates 325 the rebalancing of the cluster based on the generated tokens. In some embodiments, the front-end module 140 outputs a visualization of the rebalanced cluster to the user along with an option to run the simulation for additional iterations and/or to change the rebalancing parameters.

Figure 4A:
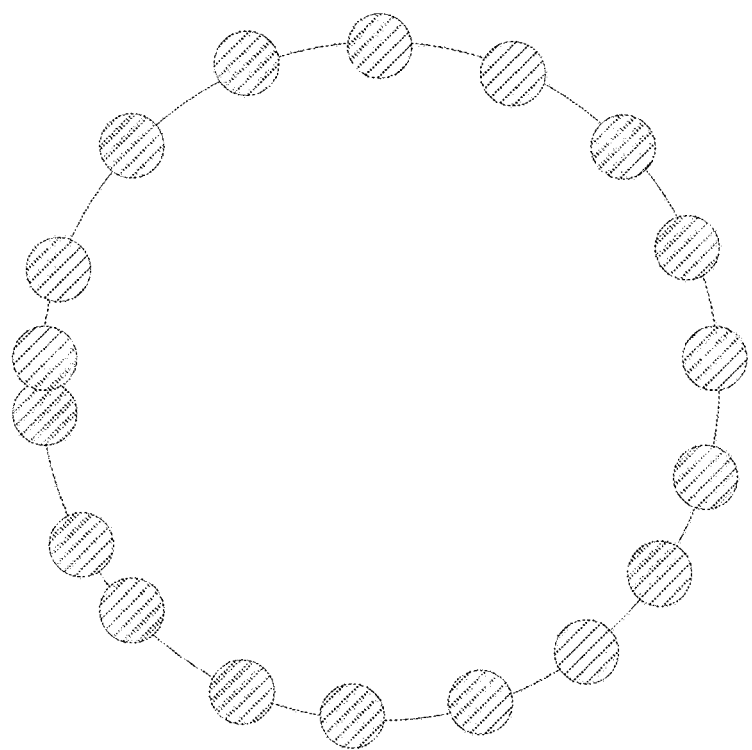
FIG. 4A-4B illustrate example clusters of nodes before and after rebalancing, according to an embodiment.
Figure 4B:
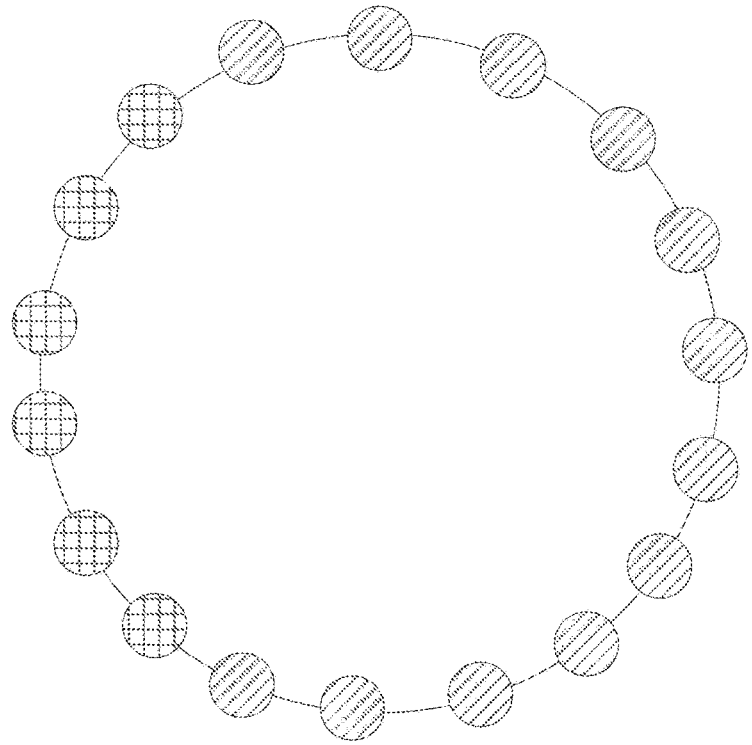

FIGS. 4A-4B illustrate example clusters of nodes 105 before and after the rebalancing simulation, in accordance with an embodiment. The example cluster shown in FIG. 4A includes 18 nodes 105 that are unevenly distributed around the token ring such that the nodes 105 are responsible for processing different amounts of data. In embodiments where the nodes 105 have the same computing power, an optimal distribution is equal distance between the nodes 105. Alternatively, if the computing power differs among the nodes 105, an optimal distribution includes an increased distance between a more powerful node 105 and its predecessor on the token ring such that the more powerful node 105 is assigned a greater workload.

The embodiment shown in FIG. 4A illustrates the initial condition of the nodes 105 prior to the rebalancing simulation. Responsive to the simulation module 150 beginning the simulation, the particles representing each node 105 begin to repel each other at velocities determined by the charge and static friction coefficients and the terminal velocities assigned to the nodes 105. The simulation module 150 performs the simulation for the specified number of iterations or for the specified period of time and outputs a token for each node 105 based on the final positions of the particles.

FIG. 4B illustrates the result of the rebalancing simulation. As shown in FIG. 4B, while the particles representing the nodes 105 are more evenly spaced than those shown in FIG. A (i.e., prior to the rebalancing), in some embodiments the output of the simulation is not equidistance between the nodes. Rather, the user may specify an optimal balance for the cluster based on the maximum transaction cost or a desired static friction coefficient. For example, in FIG. 4B, the nodes 105 shown with a diagonal pattern represent those particles that did not move during the simulation while those with a checkered pattern represent particles that did move. The simulation represented in FIGS. 4A-4B therefore represents a rebalancing simulation in which six of the eighteen particles moved and the remaining twelve particles did not move. The distance between each particle shown in FIG. 4B and its predecessor is directly proportional to the amount of data that each node 105 will be responsible for processing.

Figure 5:
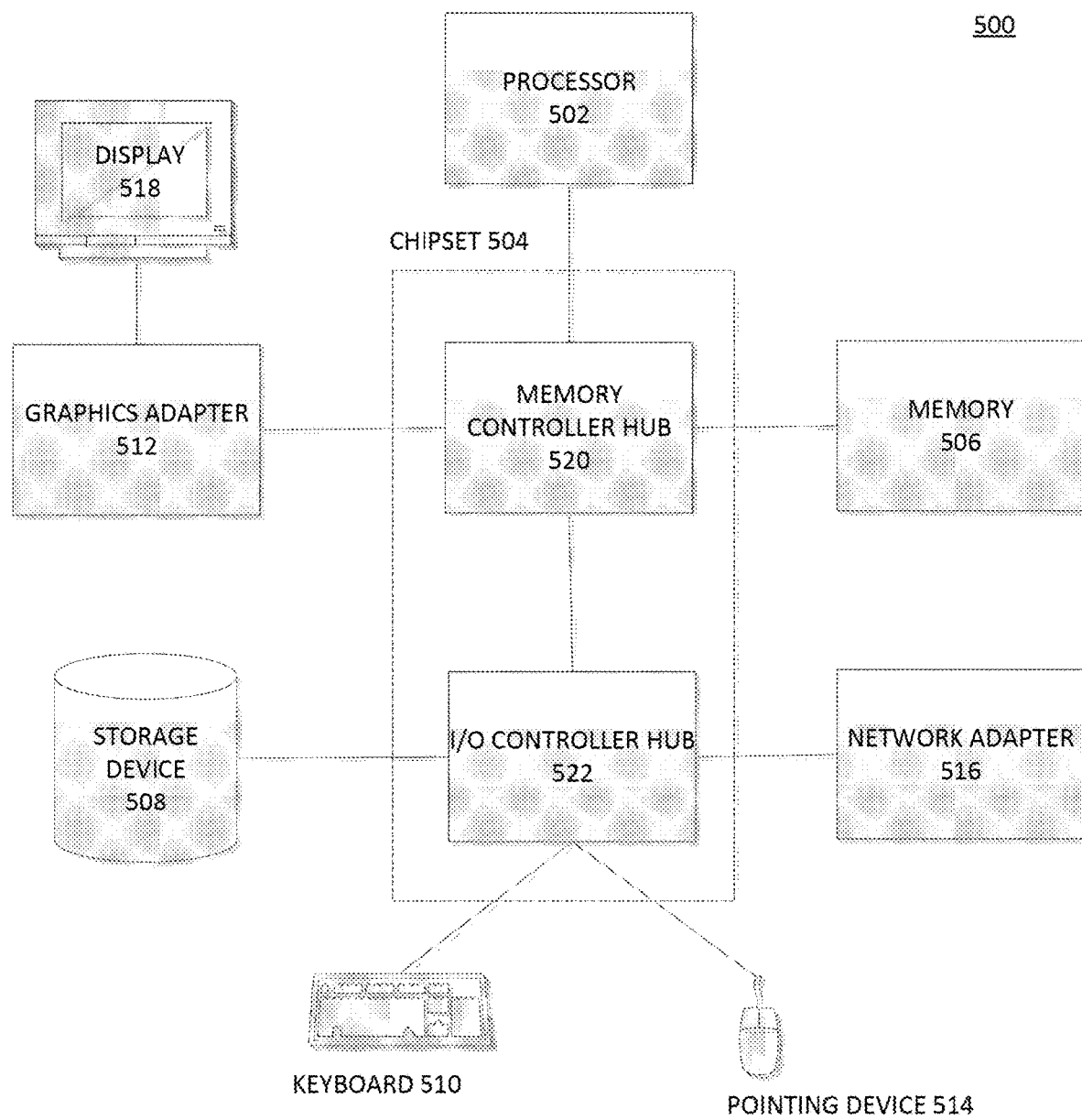
FIG. 5 illustrates example components of a computer used as part or all of the server 110 and/or the routers 105, in accordance with an embodiment.

FIG. 5 is a block diagram illustrating physical components of a computer 400 used as part or all of the server 110 and/or the routers 105, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps, operations, or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps, operations, or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A method for determining an optimal rebalancing of nodes on a token ring, the method comprising:
   receiving, from a client device, an instruction to rebalance nodes on a token ring;
   receiving an initial condition of the token ring, the initial condition indicating a number and distribution of the nodes on the token ring and a measure of computing power of each node;
   generating recommended rebalancing parameters for the token ring, the rebalancing parameters including simulation values for performing a rebalancing simulation;
   performing the rebalancing simulation based on the initial condition and the rebalancing parameters; and
   determining, for each node, a final simulation position of the node on the token ring.

2. The method of claim 1, further comprising rebalancing the nodes based on the final simulation positions.

3. The method of claim 1, wherein the recommended simulation values are based at least in part on the initial condition of the token ring.

4. The method of claim 3, further comprising generating an estimated transaction cost for performing the simulation using the recommended simulation values.

5. The method of claim 1, wherein the nodes are represented as charged particles and wherein the simulation values include: a charge coefficient of each node, a static friction coefficient of each node, a terminal velocity of the nodes, and a length of the simulation.

6. The method of claim 1, wherein the rebalancing parameters include a level of balance of the token ring.

7. The method of claim 6, wherein the level of balance is indicated by a maximum transaction cost for the rebalancing.

8. A non-transitory computer-readable storage medium storing computer program instructions executable by a processor to perform operations comprising:
   receiving, from a client device, an instruction to rebalance nodes on a token ring;
   receiving an initial condition of the token ring, the initial condition indicating a number and distribution of the nodes on the token ring and a measure of computing power of each node;
   generating recommended rebalancing parameters for the token ring, the rebalancing parameters including simulation values for performing a rebalancing simulation;
   performing the rebalancing simulation based on the initial condition and the rebalancing parameters; and
   determining, for each node, a final simulation position of the node on the token ring.

9. The non-transitory computer-readable storage medium of claim 8, further comprising rebalancing the nodes based on the final simulation positions.

10. The non-transitory computer-readable storage medium of claim 8, wherein the recommended simulation values are based at least in part on the initial condition of the token ring.

11. The non-transitory computer-readable storage medium of claim 10, further comprising generating an estimated transaction cost for performing the simulation using the recommended simulation values.

12. The non-transitory computer-readable storage medium of claim 8, wherein the nodes are represented as charged particles and wherein the simulation values include: a charge coefficient of each node, a static friction coefficient of each node, a terminal velocity of the nodes, and a length of the simulation.

13. The non-transitory computer-readable storage medium of claim 8, wherein the rebalancing parameters include a level of balance of the token ring.

14. The non-transitory computer-readable storage medium of claim 13, wherein the level of balance is indicated by a maximum transaction cost for the rebalancing.

15. A system comprising:
   a computer processor for executing computer program instructions; and
   a non-transitory computer-readable storage medium storing computer program instructions executable by the processor to perform operations comprising:
      receiving, from a client device, an instruction to rebalance nodes on a token ring;
      receiving an initial condition of the token ring, the initial condition indicating a number and distribution of the nodes on the token ring and a measure of computing power of each node;

generating recommended rebalancing parameters for the token ring, the rebalancing parameters including simulation values for performing a rebalancing simulation;

performing the rebalancing simulation based on the initial condition and the rebalancing parameters; and determining, for each node, a final simulation position of the node on the token ring.

16. The system of claim 15, further comprising rebalancing the nodes using based on the final simulation positions.

17. The system of claim 15, wherein the recommended simulation values are based at least in part on the initial condition of the token ring.

18. The system of claim 15, wherein the nodes are represented as charged particles and wherein the simulation values include: a charge coefficient of each node, a static friction coefficient of each node, a terminal velocity of the nodes, and a length of the simulation.

19. The system of claim 15, wherein the rebalancing parameters include a level of balance of the token ring.

20. The system of claim 19, wherein the level of balance is indicated by a maximum transaction cost for the rebalancing.

* * * * *